United States Patent [19]
Beattie

[11] 3,907,157
[45] Sept. 23, 1975

[54] LOCKING DEVICE

[75] Inventor: David Anthony Beattie, Runcorn, England

[73] Assignee: Imperial Chemical Industries Limited, London, England

[22] Filed: Mar. 15, 1974

[21] Appl. No.: 451,692

[30] Foreign Application Priority Data
Apr. 3, 1973    United Kingdom............... 15828/73

[52] U.S. Cl............................. 220/327; 292/256.75
[51] Int. Cl.$^2$......................................... B65D 45/00
[58] Field of Search ........... 220/243, 247, 250, 262, 220/315, 327, 328; 292/256.75, DIG. 72

[56] References Cited
UNITED STATES PATENTS

| | | | |
|---|---|---|---|
| 2,113,776 | 4/1938 | Smith................................. | 220/327 |
| 3,187,929 | 6/1965 | Shaw, Jr. ............................ | 220/327 |

Primary Examiner—William I. Price
Assistant Examiner—Steven M. Pollard
Attorney, Agent, or Firm—Cushman, Darby & Cushman

[57] ABSTRACT

A locking device is provided for a pressure vessel comprising a swing bolt adapted to be pivotally mounted upon the body of a pressure vessel and to be swung between (i) a locking position in which the bolt is adapted to couple the body of the vessel to a closure member when an associated nut, held captive on the bolt, is tightened, and (ii) a release position in which the bolt is clear of the closure member, the said bolt being provided with cam means adapted to co-operate with a projection carried by the closure member and thereby obstruct closure of the vessel until the bolt is in the locking position, catch means also being provided for preventing the said bolt from being swung out of the locking position until the said nut has been loosened to a predetermined extent.

6 Claims, 2 Drawing Figures

LOCKING DEVICE

This invention relates to a locking device for a pressure vessel of the kind having a bolted closure member.

In a wide variety of pressure vessels, for example autoclaves and tanks used for transportation or storage of gases and liquids under pressure, a hazard often arises when a closure member is opened or removed in order to gain access to the interior of the vessel. The closure member, whether a completely removable lid or a hinged door, is usually retained in the closed position by a series of nuts engaging juxtaposed bolts disposed around the periphery of the closure member.

Opening or removal of the closure member is hazardous when there is residual pressure in the vessel; such pressure can cause the closure member to burst open suddenly when the nuts are loosened slightly, with a risk not only of injury to the operator but also of hazardous consequences of the sudden escape of the residual contents of the vessel. This hazard arises with a wide variety of pressure vessels, especially with road tankers.

In an attempt to avoid this hazard it has previously been proposed to fit pressure vessels with at least one specially designed swing bolt which cannot be swung from a locking position to a release position until the associated nut has been loosened to a predetermined extent. Such a device is described, for example, in the specification of UK Pat. No. 1,302,698.

It is especially hazardous when sticking of the closure member on its seating occurs during opening or removal thereof. In a preferred embodiment of the device described in the said specification the nut associated with the specially designed swing bolt is provided with a flange which, as the nut is being loosened, engages a stop or lug on the closure member; this engagement ensures that the closure member is separated from its seating before the nut has been loosened to the extent necessary to allow the bolt to be swung from the locking position to the release position.

While such devices function satisfactorily if properly assembled before closure of the vessel is effected, they suffer from the disadvantage that it is possible to close the vessel without having ensured that the locking device is in its operative position. This is especially liable to happen when the locking device is used in conjunction with a plurality of ordinary nuts and bolts; an operator may, inadvertently or otherwise, neglect to assemble the locking device and rely upon the tightening of one or more ordinary nuts to effect closure of the vessel.

According to the present invention there is provided a locking device for a pressure vessel comprising a swing bolt adapted to be pivotally mounted upon the body of a pressure vessel and to be swung between
  i. a locking position in which the bolt is adapted to couple the body of the vessel to a closure member when an associated nut, held captive on the bolt, is tightened, and
  ii. a release position in which the bolt is clear of the closure member,
  the said bolt being provided with cam means adapted to co-operate with a projection carried by the closure member and thereby obstruct closure of the vessel until the bolt is in the locking position, catch means also being provided for preventing the said bolt from being swung out of the locking position until the said nut has been loosened to a predetermined extent.

The invention is applicable both to vessels having hinged closure members and to vessels having completely removable closure members.

As in the device described in the specification of UK Pat. No. 1,302,698 the catch means for preventing the bolt from being swung out of the locking position (until the nut has been loosened to a pre-determined extent) conveniently comprise a slotted member co-operating with flats on the bolt, the said flats being presented to a juxtaposed slot, thereby allowing release of the bolt only when the nut has been loosened to the predetermined extent.

Also as in the device described in the said specification, the nut is preferably provided with a flange adapted to urge the closure member into an open position upon loosening of the nut to a predetermined extent, thereby ensuring at least partial leakage of any residual pressure from the vessel while the bolt is still in the locking position.

The nut member may be permanently retained in captivity to the closure member, for example, by an abutment welded to the nut beyond the required travel of the nut. Alternatively, the nut may be retained by a removable retaining member, thus allowing the nut to be replaced from time to time if necessary. If such a removable retainer member is used a suitable seal may be fitted, if desired, to prevent tampering with the device. When the closure member is completely removable and the device is used in conjunction with conventional bolts it is desirable to make the disposition of the conventional bolts about the periphery of the vessel unsymmetrical, thereby ensuring that the closure member can only be assembled with the swing bolt of the present invention in its proper position.

An embodiment of the invention will now be described, by way of example, with reference to the accompanying drawings, in which.

Figure 1:
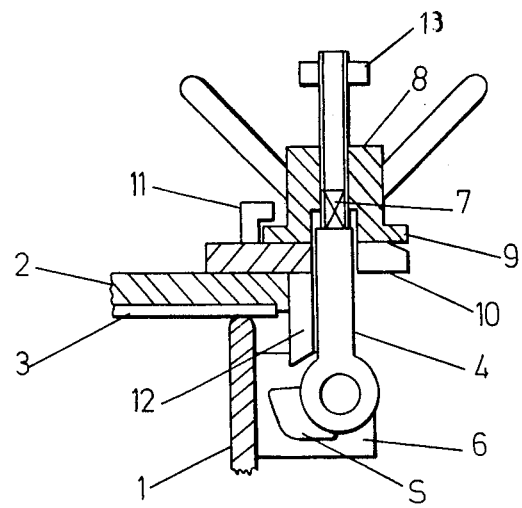
FIG. 1 is a sectional elevation of the device in the locking position

A pressure vessel 1 has a hinged man-lid 2, a sealing gasket 3 being interposed between the lid 2 and the surface of the vessel upon which the lid seats.

A swing bolt 4 having a cam attachment 5 is pivotally mounted outside the vessel between a pair of trunnions 6. The portion of the shank of the bolt 4 adjacent to the pivot is unthreaded and is of larger diameter than the rest of the shank, which is threaded and provided with diametrically-opposed flats 7 at the start of the threaded portion.

A nut 8 having a flange 9 is carried by the threaded portion of the bolt 4, the nut being cut away so as to clear the unthreaded portion of the bolt.

A slotted bracket 10 is welded to the outer surface of the lid 2, the slot being of such shape and dimensions that the bolt 4 can pass therethrough when the flats 7 are in juxtaposition to the slot but the slot 4 is retained by the bracket 10 when the unthreaded portion of the bolt 4 is in juxtaposition to the slot.

The bracket 10 carries a flange member 11 providing an abutment for the flange 9 of the nut 8. The bracket 10 also carries a projection 12 which clears the cam 5 when the bolt 4 is in the locking position (as shown in FIG. 1) but encounters the cam 5 if an attempt is made to close the lid with the bolt 4 in the release position (as shown in FIG. 2).

A retaining bar 13 keeps the nut 8 captive upon the bolt 4.

Figure 2:
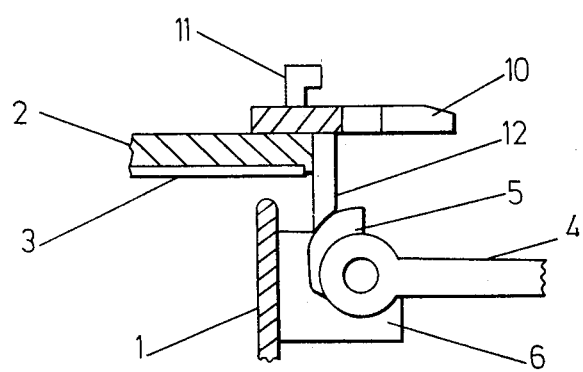
FIG. 2 is a sectional elevation (omitting the nut and a portion of the bolt) of the device in the release position.

The operation of the device will now be described, starting with the bolt in the locking position as shown in FIG. 1.

As the nut 8 is loosened and moved upwards on the thread of bolt 4, flange 9 of the nut engages the flange 11 carried by the bracket 10 and as movement of the nut 8 continues the lid 2 is forced away from its seating, thus allowing leakage of any residual pressure from the vessel. Further movement of the nut 8 clears the flats 7 and prevents the flats in juxtaposition to the slot of 10, thus enabling the bolt 4 to be swung into the release position (as shown in FIG. 2).

When it is desired to return the lid to the closed position the bolt 4 must be swung into the proper position with the flats 7 in juxtaposition to the slot of the bracket 10; otherwise the projection 12 will meet the cam 5, thus preventing closure of the lid.

What is claimed is:

1. A pressure vessel safety lock comprising:
 a swing bolt pivotally mounted to a pressure vessel so as to be movable to opened and closed positions wherein said swing bolt comprises a mounting portion having a shaft extending therefrom, said shaft having a threaded top portion having a nut member thereon,
 a stop device attached to said mounting portion,
 a lid for said vessel,
 a bracket fixed to the lid, said bracket having two arms extending away from the lid defining a slot therebetween,
 at least one projection attached to the bottom of said bracket and extending downwardly therefrom beyond said lid,
 means mounted on said bracket and adapted to engage said nut member so that said means are engaged by said nut member to close said lid upon tightening of said nut member and engaged by said nut member upon loosening of said nut member to raise said lid,
 said stop device being mounted on said bolt such that said at least one projection contacts said stop device when said bolt is in an open position so as to prevent further downward movement of said lid.

2. A pressure vessel safety lock as claimed in claim 1 wherein said shaft has middle and bottom portions, said bottom portion being adjacent said mounting portion, said middle portion being adapted to engage with said slot, and wherein the walls of said slot adjacent the rear portion of said slot define an enlarged opening extending through said bracket.

3. A pressure vessel safety lock as claimed in claim 2 wherein said top and middle portions of said shaft are of a smaller diameter than said bottom portion, said middle portion being flattened so as to slidably engage with said slot, said bottom portion of said shaft extending into said enlarged opening when said lid is closed.

4. A pressure safety lock comprising: a swing bolt pivotally mounted to a pressure vessel so as to be movable between open and closed positions, wherein said swing bolt comprises a mounting portion having a shaft extending therefrom, said shaft having a threaded portion, said swing bolt including a stop device movable therewith, a lid for said vessel, a bracket member fixed to said lid so that at least a portion extends away from said lid, said portion including at least one downwardly projecting member, a nut member having a threaded inner portion adapted to engage the threaded portion of said swing bolt, said nut member further comprising an outer surface adapted to engage said bracket so as to close said lid upon the tightening of said nut member to said swing bolt and to rise said lid upon the loosening of said nut member on said swing bolt, said stop device being positioned such that said projection contacts said stop device when said swing bolt is in an open position thereby preventing further downward movement of said lid.

5. A pressure safety lock comprising: a swing bolt pivotally mounted to a pressure vessel so as to be movable between open and closed positions, wherein said swing bolt comprises a mounting portion having a shaft extending therefrom, said shaft having a threaded portion, a lid for said vessel, a bracket member fixed to said lid so that at least a portion extends beyond said lid, a nut member having a threaded inner portion adapted to engage the threaded portion of said swing bolt, said nut member further comprising an outer surface adapted to engage said bracket so as to close said lid upon the tightening of said nut member to said swing bolt and to raise said swing bolt and means for preventing closure of said lid when said swing bolt is in its open position.

6. A pressure safety lock as claimed in claim 5 wherein said closure preventing means comprises a stop device forming a part of said swing bolt and a downwardly projecting member forming a part of said bracket, said stop device and said projecting member being positioned such that said projecting member will come into contact with said stop device when said lid is lowered into place on said vessel and said swing bolt is in its open position thereby preventing further lowering of said lid.

* * * * *